Figure 1:
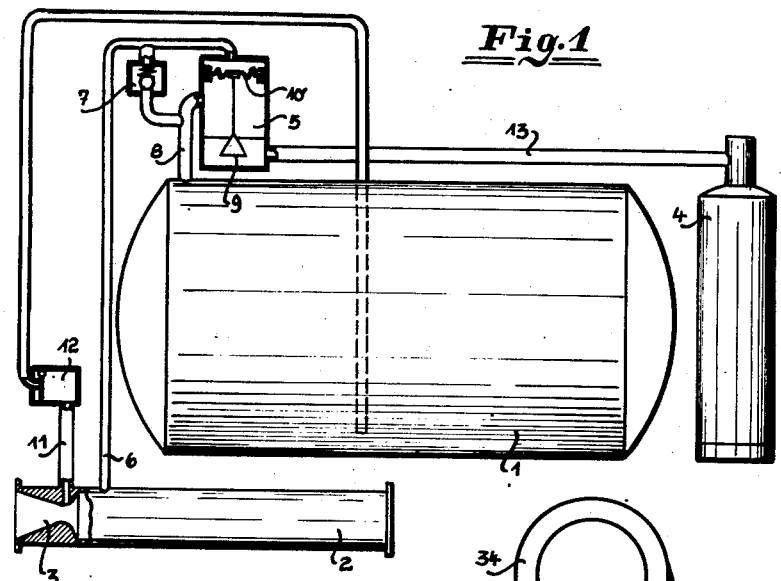

May 3, 1955   E. KLOSSE   2,707,480
SELF PROPORTIONING SYSTEM
Filed May 3, 1951   3 Sheets-Sheet 1

INVENTOR.
ERNST KLOSSE
BY
Emery L. Groff
Attorney

May 3, 1955              E. KLOSSE                2,707,480
SELF PROPORTIONING SYSTEM
Filed May 3, 1951                                      3 Sheets-Sheet 2
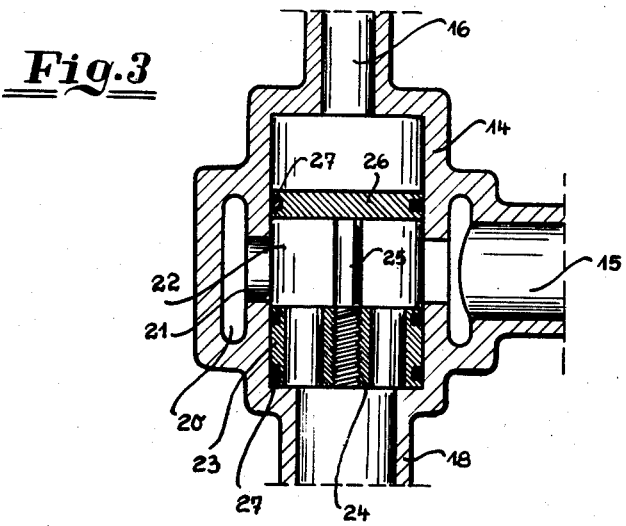
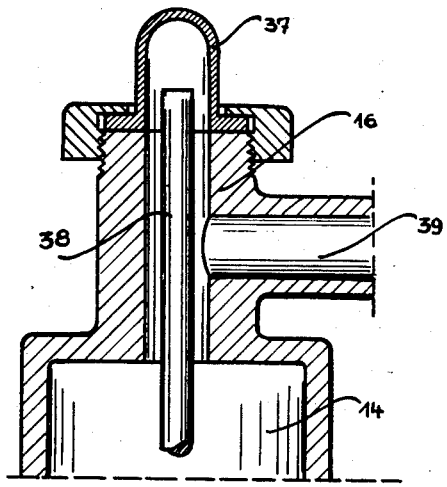
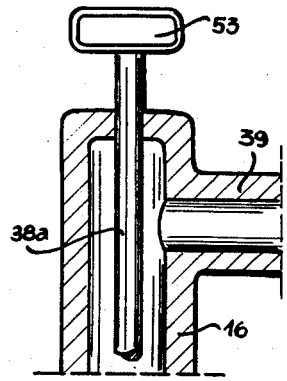
INVENTOR.
ERNST KLOSSE
BY May 3, 1955  E. KLOSSE  2,707,480
SELF PROPORTIONING SYSTEM
Filed May 3, 1951  3 Sheets-Sheet 3
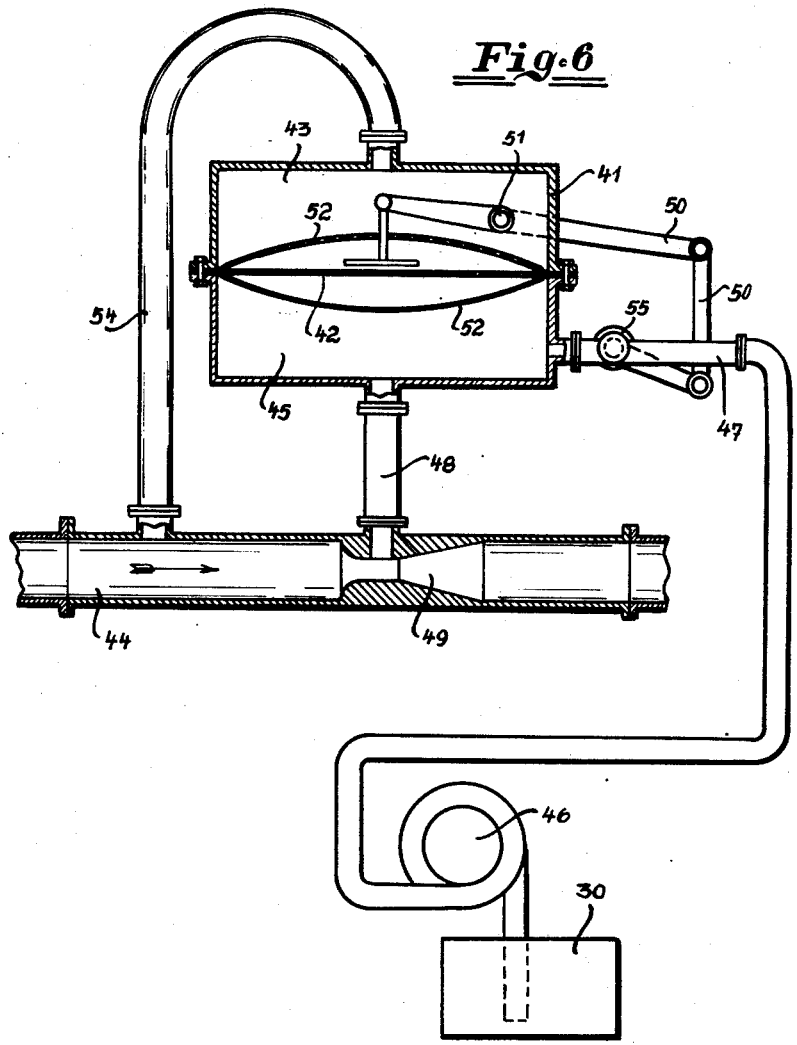
INVENTOR.
ERNST KLOSSE
BY
Emory L. Groff
Attorney

United States Patent Office 2,707,480
Patented May 3, 1955

2,707,480

SELF PROPORTIONING SYSTEM

Ernst Klosse, Ladenburg, Germany

Application May 3, 1951, Serial No. 224,332

Claims priority, application Germany May 3, 1950

4 Claims. (Cl. 137—98)

The invention relates to an arrangement for the regulation of the pressure of a secondary liquid to be admixed with a main liquid under pressure, in dependence upon the pressure of the main liquid. The arrangement is particularly useful for foam fire-extinguishing installations.

In such installations, the secondary liquid, such as a wetting or foaming agent must be added to the extinguishing water delivered by a pump, in a predetermined mixing ratio which remains constant even when pressure fluctuations occur in the extinguishing water duct. To accomplish this purpose means are known for controlling the delivered quantity of the liquid to be admixed in dependence upon the pressure in the main liquid duct. For example by introducing a branch stream of the main liquid directly into a closed container holding the liquid to be admixed, whereby the latter liquid is forced out of the said container; or by employing the branch stream of the main liquid to drive a pump which sucks the liquid to be admixed out of a pressureless storage container and forces it into the main liquid duct. However, such arrangements have the disadvantage that when the branch stream of the main liquid is introduced into the container holding the liquid to be admixed, premixing with the liquid to be admixed sometimes occurs, and when the branch stream is employed to operate a delivery pump this branch liquid is lost.

The invention concerns a new arrangement for regulating the admixing of the secondary liquid, the said arrangement being controlled by a branch stream of the main liquid and operating without loss of liquid, while preventing premixing of the two liquids. In accordance with the invention, the new regulating arrangement consists of a control cylinder subdivided into two chambers by a yieldable partition, one of the said chambers being under the pressure of the branch stream of the main liquid, and the other chamber under the pressure of the secondary liquid, while the said partition is coupled with a control member regulating the delivery pressure of the secondary liquid. The yieldable partition may consist of a diaphragm subdividing the control cylinder or a piston slidable therein and controlling through a piston rod or other linkage a regulating valve determining the supplied quantity of secondary liquid or the supplied quantity of pressure medium by which the said secondary liquid is delivered.

Figure 2:
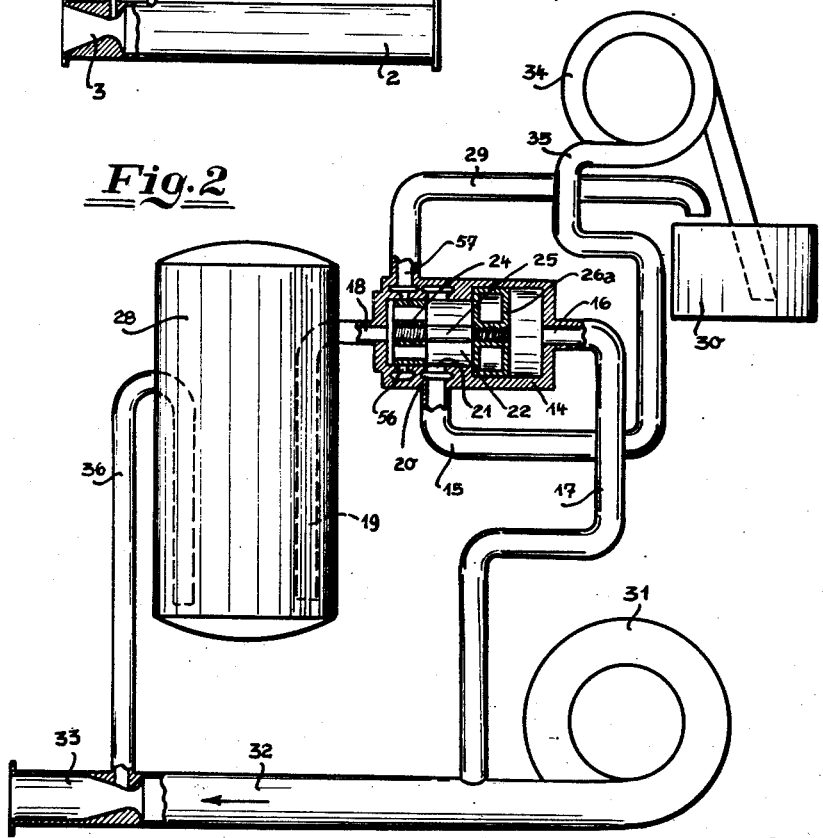

The new arrangement will hereinafter be more fully described with reference to the accompanying drawings in which:

Figure 1 shows a constructional form in which the secondary liquid held in a closed storage container is under the pressure of a pressure gas, Figure 2 shows a second constructional form in which the secondary liquid is delivered by a pump, Figure 3 shows a simpler construction of the control cylinder for the embodiment shown in Figure 2, Figures 4 and 5 show a supervisory means and a manual control means respectively, and Figure 6 shows a third constructional form.

The storage container 1 for the liquid to be admixed is connected to the Venturi nozzle 3 of the main duct 2 by a delivery duct 11 in which a non-return valve 12 is provided. The container 1 also communicates through a duct 8, 13, in which a regulating valve 9 is provided, with a source of pressure gas 4. The regulating valve 9 is coupled with a diaphragm 10 held fast in the control cylinder 5. The diaphragm 10 is subjected on one side to the action of the pressure in the container 1 and is loaded on the other side through the duct 6 by a branch stream of the main liquid. The duct 8 also feeds an over-pressure valve 7, the outlet from which leads to the branch stream duct 6.

To set the arrangement in operation, the flow of main liquid through the duct 2 is freed by opening the main valve of the pressure gas cylinder 4. A branch stream of the main liquid in the duct then acts on the diaphragm 10 through the duct 6 and releases the regulating valve 9 in accordance with the pressure in the main duct 2, so that the pressure gas passes through the duct 8 into the storage container and places the latter under pressure. The liquid to be admixed is introduced into the duct 2 at the narrowest point of the Venturi element by way of the duct 11 by the super-pressure set up in the container, the non-return valve 12 preventing the passage of main liquid into the container 1 in the event of the pressure in the container ceasing or suddenly falling, while inadmissible excess pressure in the container 1 is balanced out by an over-pressure valve 7 branched off from the pressure gas duct 8.

In the arrangement for continuous operation shown in Figures 2 and 3, the regulating arrangement consists of a cylinder chamber 14 having a radial connecting nipple 15 for the delivery of the foam-forming agent, an axial nipple 16 for the connection of the control duct 17 and a nipple 18 at the other end, connected to the duct 19 leading to the compensating container 28. The nipple 15 leads into an annular chamber 20 communicating through ports 21 in the jacket with the cylinder chamber 22. A port 21 extending completely around the circumference may be provided. Similarly, a subdivision into a plurality of passages decreasing in width in the upward direction may be effected by means of inserted bridge members.

Guided in the cylinder chamber 22 is an annular slide valve 23 which is arranged to be displaced from a lower opening position in which the ports 21 are unmasked into a closing position in which the ports are masked. The annular slide valve 23 carries on ribs, a boss 24 into which a piston rod 25 with a piston 26 is screwed. The length of the piston rod 25 is such that the piston 26 remains above the delivery ports 21 in each position of the slide valve 23 (Figure 3).

The packing of the piston 26 and of the annular slide valve 23 in the cylinder 14 is effected by piston rings 27. The piston 26 is thus loaded on its lower face by the pressure in the compensating container 28 and on its upper face by the pressure in the branch stream duct 17. When the pressure in the branch stream duct 17 falls in relation to the pressure in the compensating container 28, the piston 26 is lifted so that the annular piston 23 more or less closes the ports 21 until pressure equilibrium again obtains on both sides of the piston 26.

In order that the weight of the piston 26 bearing on the annular slide valve 23 may be disregarded in the construction of the arrangement, the piston 26a shown in Figure 2 is fashioned as a hollow piston, in which case it is preferably of such dimensions that it is borne together with the annular slide valve by the specifically heavier foam-forming agent. Moreover, the piston 26a and the annular slide valve 23 have in their surrounding surfaces slots constituting a form of labyrinth packing in order to reduce the friction.

In the construction shown in Figure 2, in which the hollow piston 26a has a larger diameter than the annular slide valve 23, the cylinder chamber 22 is formed with a second annular passage 56 connected through a nipple 57 and a duct 29 to the storage container 30 for the foam-forming agent. The annular passage 56 is so formed that it is not freed by the annular slide valve 23 until the latter has masked the ports 21, so that the flow of foam-forming agent out of the compensating container to the storage container provides pressure equality between the compensating container and the pressure duct.

The extinguishing water is fed by a pump 31 to the pressure pipe 32, in which a Venturi nozzle 33 is provided. The branch stream duct 17 is branched off from the pressure duct 32 and leads to the cylinder 14. The foam-forming agent is fed by a pump 34 through the pipe 35 and the branch pipe 15 to the cylinder 14 from the storage container 30, the piston 26a lying between the two connections 15, 16. The foam-forming liquid entering the cylinder chamber 22 through the duct 35 in accordance with the degree to which the annular slide valve 23 is opened passes through the duct 19 into the compensating container 28, from which it is fed through the duct 36 to the Venturi nozzle 33 of the pressure duct 32 in accordance with the quantity delivered.

When the ports 21 are closed by the annular slide valve 23, foam-forming liquid can flow back into the storage container 30 through the annular passage 56 which is then open and through the duct 57, 29, in order to effect pressure equalization between the pressure duct 32 and the compensating container 28.

In order to indicate the position of the piston in the cylinder 14, the flange 16 is covered by a hood 37 (Figure 4) of glass or the like into which an indicating pin 38 extending up from the piston 26 projects, the control duct 17 being laterally connected to the flange 16 at 39. The hood 37 or the pin 38 may be provided with indicating marks (Figure 4).

Moreover, the indicating pin 38a may extend outwardly through a stuffing box packing of the flange 16 and be provided with a manual control member 53 (Figure 5) in order that manual adjustment may be effected if necessary.

The new construction is not limited in its application to arrangements for admixing a foam-forming agent with fire extinguishing water, but may be applied in all cases where two liquids are to be delivered under equal pressure.

The piston 26 may be constructed as a differential piston.

In the construction shown in Figure 6, the control cylinder 41 is subdivided by a diaphragm 42 into two chambers 43, 45, the chamber 43 being connected to a branch stream duct 54 branched from the pressure duct 44. The medium to be admixed, for example a foam-forming liquid, is fed to the chamber 45 by a delivery pump 46 through a duct 47 and then forced through a duct 48 into the admixing nozzle of a Venturi tube 49 provided in the pressure duct 44.

The partition 42 is coupled by a linkage 50 extending out of the chamber 43 through a stuffing box 51, with a throttle valve 55 in the admixing duct 47 extending from the pump, or is connected by the said linkage to a regulator for the pump drive.

The pressure differences set up in the chambers 43 and 45 during operation deflect the partition 42 to a varying extent between the perforated plates 52 by which it is embraced, whereby the regulating arrangement is operated.

I claim:
1. An admixing apparatus comprising, a pressure source of fluid, a control means, a first duct connecting said pressure source and said control means, a container means for storing a secondary fluid material to be admixed, a second duct connecting said control means to said container means, a main conduit adapted to have a primary fluid material and said secondary fluid material flow therethrough, pressure differential producing means within said main conduit, a third duct directly connecting said pressure differential producing means and said container means, a fourth duct connecting said control means and said main conduit, said control means including valve means for regulating the flow of fluid under pressure from said pressure source into said container means in response to fluctuations in the pressure exerted by said primary fluid material flowing through said pressure differential producing means within said main conduit, whereby, upon flow of pressure fluid into said container means, secondary fluid material will be forced through said third duct to be admixed with said primary fluid material flowing through said main conduit.

2. The apparatus of claim 1 wherein said control means comprise a cylinder, a piston, and said valve means, said piston partitioning said cylinder into a first and a second chamber, said valve means being positioned in said first chamber, said valve means being coupled to said piston, said cylinder having a port connecting said first duct and said first chamber, said second duct communicating with said first chamber, said fourth duct communicating with said second chamber, and said valve means being adapted to cover and uncover said port.

3. An apparatus for regulating the admixing of two fluids the first of which is under a higher pressure than the second, comprising, in combination, a main conduit in which said first fluid and said second fluid are adapted to flow, a Venturi nozzle in said main conduit, a control cylinder, a piston slidable in said cylinder and dividing said cylinder into a first and a second chamber, an annular slide valve positioned in said first chamber and coupled to said piston, the portion of said cylinder forming said first chamber having a port therein, a pressure source, a pipe connecting said pressure source with said port, a container adapted to hold said second fluid, a tube connecting said container with said first chamber, a duct interconnecting said container and said Venturi nozzle, a conduit connected to said main at a point remote from said Venturi nozzle and communicating with said second chamber, and said slide valve being adapted to cover and uncover said port in response to differences in pressure between said Venturi nozzle and said remote point of said main.

4. The apparatus of claim 3 wherein said portion of the cylinder forming said first chamber is provided with a second port, a reservoir, a second pipe connecting said second port and said reservoir, said slide valve being adapted to uncover said second port when said first port is completely covered, whereby said second fluid may flow from said container into said reservoir.

References Cited in the file of this patent

UNITED STATES PATENTS

| | | |
|---|---|---|
| 1,257,070 | Discher | Feb. 19, 1918 |
| 1,452,265 | Collins | Apr. 17, 1923 |
| 1,930,848 | Ashley | Oct. 17, 1933 |
| 2,004,869 | Hogg | June 11, 1935 |
| 2,090,069 | Richardson et al. | Aug. 17, 1937 |
| 2,128,721 | Watts | Aug. 30, 1938 |
| 2,145,114 | Gibbs et al. | June 24, 1939 |
| 2,189,235 | Wanner | Feb. 6, 1940 |
| 2,216,422 | Schemanek | Oct. 1, 1940 |
| 2,224,101 | Hegwein | Dec. 3, 1940 |
| 2,379,633 | Garretson | July 3, 1945 |